April 28, 1936. J. A. MURPHY, JR 2,038,850
PROCESS FOR RECOVERY OF METAL VALUES
Filed Sept. 29, 1934
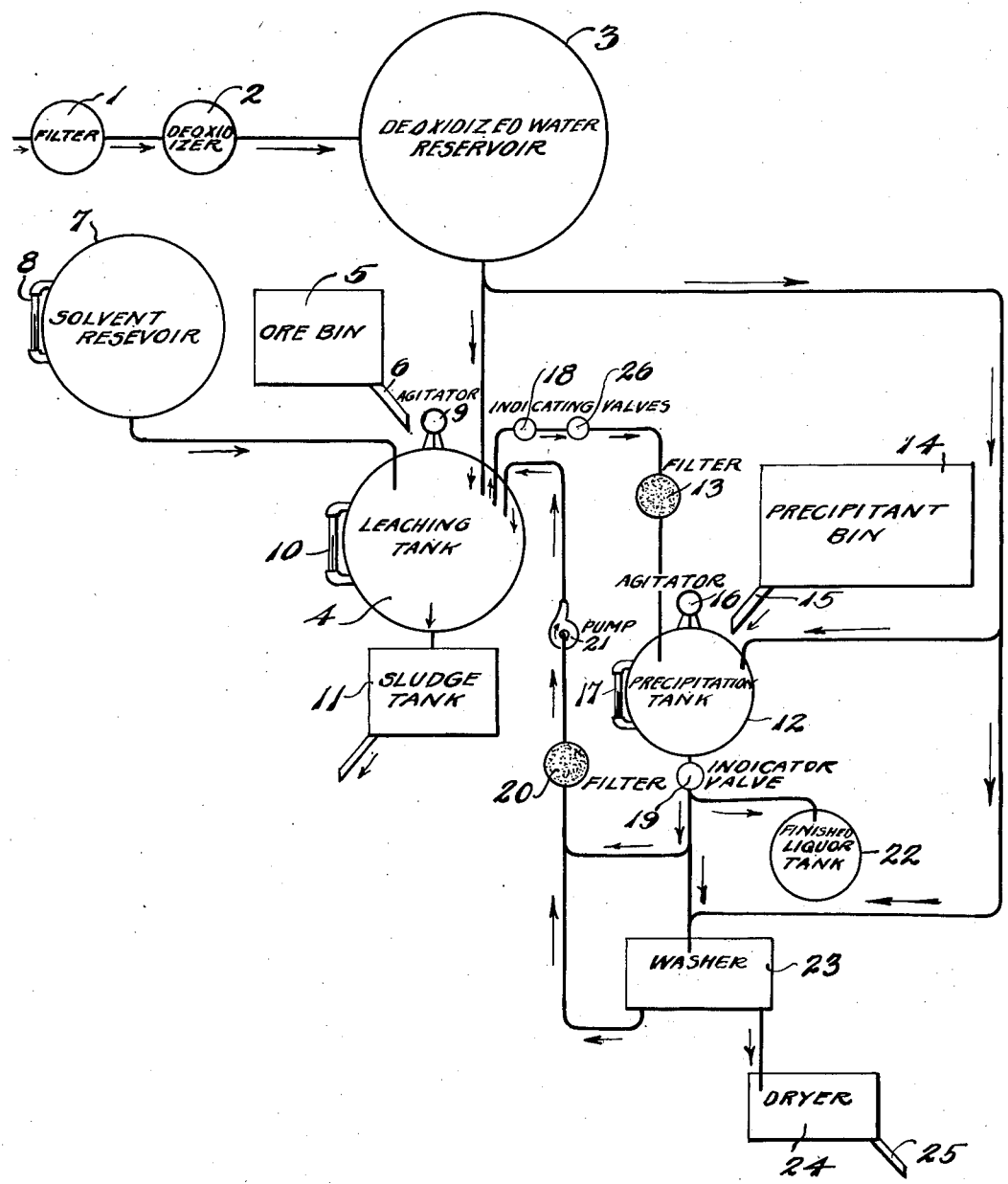

Patented Apr. 28, 1936

2,038,850

UNITED STATES PATENT OFFICE 2,038,850

PROCESS FOR RECOVERY OF METAL VALUES

John Augustus Murphy, Jr., Tulsa, Okla.

Application September 29, 1934, Serial No. 746,132

11 Claims. (Cl. 75—117)

The present invention relates to a novel process for the recovery of metal values and to products therefrom.

The improved process for the recovery of values from metal bearing solutions as represented by the present invention, provides a distinct advance in the art in that the metal recovered is substantially completely free from contaminating materials and is obtained in a substantially pure condition and in a form readily adaptable for use in highly diversified applications.

The present invention provides, in general, a process by means of which the metal values are obtained principally in finely divided elemental condition and substantially free from metallic oxides and other contaminating materials. This is especially significant when it is recalled that in the case of metals precipitated from their solutions by cementation through the use of metallic precipitants of a more electropositive character, the recovered metal usually contains a more or less high content of oxide and metallic salts, especially the former, in view of the fact that the precipitated metal is thrown out of solution in a condition which is readily oxidizable.

The present invention utilizes cementation as a step in the recovery of the metal values present in the solution, but it provides a process wherein the precipitated metal is virtually free from contaminating oxides and other impurities.

A further object of the invention is to provide a cyclic process wherein a metal bearing material is subjected to a leaching operation to produce the desired solution, the values being precipitated by cementation or equivalent operation, and in which the leaching materials and by-products produced in the course of the reaction are recovered in an economical manner for reuse in the process or for further treatment.

A still further object of the invention is to provide leach liquids in which the quantity of dissolved or mechanically contained oxygen has been substantially completely removed prior to the precipitation of the metal values, thereby preventing the formation of oxide in the recovered metal which is obtained in a high degree of purity and in a highly active form which lends itself effectively to any desired use for which the recovered metal may be desired.

Further objects and advantages of the process will become apparent as the description proceeds, and the features of novelty will be more particularly pointed out and defined in the appended claims; and while the process will be specifically described in connection with the treatment of copper-bearing materials it is applicable to metal-bearing materials other than those of a cupriferous character, such as, for example, zinc- or tin-bearing materials, with a corresponding suitable selection of leaching solutions and precipitants as will become apparent to one skilled in the art.

As applied to the treatment of copper-bearing ores or other materials, these are roasted, if necessary, to convert the materials into readily soluble form. Very desirably, the materials are in the form of sulphate, oxide, or carbonate, as such compounds are readily soluble in an acid leach solution. An important feature of the process is the utilization of liquids for leach purposes which are free or substantially free from dissolved or mechanically entrained oxygen. To this end, the leaching container is supplied with water which has been treated for the removal of free oxygen, and also it is found to be of advantage that the acid solution employed for the leaching should also be freed from free oxygen. Hydrochloric or sulphuric acid solutions are suitable for the leaching operation. The resulting solution is separated from the sludge remaining undissolved in the leaching tank and is transferred under conditions preventing absorption of oxygen into the precipitating tank containing a metal electropositive to copper, which will produce a precipitation of the copper. As examples of such precipitating metal, aluminum or iron may be mentioned. The copper is deposited in a finely divided condition, and since there is substantially no free oxygen present, there is no tendency for oxide to form during the precipitation. When the precipitation is complete, the copper is removed and washed with deoxidized water. The resulting wash liquors may be returned to the leaching tank, while the solution resulting from the copper precipitation and containing aluminum salts is withdrawn and treated for the recovery of the aluminum content thereof. The precipitated copper may be dried under non-oxidizing conditions and thus obtained as pure copper.

The details of the process will be more fully described and understood by reference to the accompanying drawing, which is a diagrammatic flow sheet of the process.

Referring more particularly to the drawing, the reference numeral 1 indicates a water filter of any standard construction which is connected to any suitable source or supply of water, not shown, which water, after filtering, passes to the deoxidizer 2, which is a substantially closed tank but which has an opening therein sufficiently large to permit the deoxidizing material to be introduced into the tank. Scrap iron is a suitable deoxidizer, the dissolved oxygen in the water combining with the iron.

The deoxidizer 2 is in turn connected with a tank 3 which serves as a reservoir for the deoxidized water. The tank 3 is preferably elevated above the other units of the system so that the water may be fed from the tank by gravity. Suitable pipe lines connect the reservoir 3 with other units of the system as will be described hereinafter in greater detail, including a leaching tank 4. The reservoir 3 is a tank of suitable dimensions, being closed in such manner as to prevent contamination of the water from dirt and dust and also from excessive contact with the air.

The leaching tank 4 is formed of any suitable acid-resisting material and is adapted to receive the supply of material to be leached, which is contained in the ore bin 5 and which is suitably finely divided to facilitate the solution thereof. A discharge chute 6 guides the material into the leaching tank, the material being delivered preferably by gravity from the bin 5.

The leaching tank receives solvent liquid from the solvent reservoir 7, which may be provided with a suitable gauge 8 for rendering readily visible the depth of solvent in the tank 7. The solvent tank is preferably elevated above the leaching tank 4 so that the solvent may flow into the leaching tank by gravity. As has been mentioned above, sulphuric or hydrochloric acid is a suitable solvent.

The leaching tank is provided with an agitator 9 of suitable standard construction, such as a rotary paddle type, the paddles being of acid resisting material. Agitator 9 assures intimate intermixing of the ore from bin 5 with the solvent, water from the reservoir 3 being admitted to the tank 4 in controlled amounts. The amount of the material in the leaching tank may be determined by gauge 10 suitably mounted on the tank 4. A sludge tank 11 is adapted to receive insoluble material or residue from the tank 4.

When the solvent from solvent reservoir 7 has become sufficiently enriched with dissolved material, as determined by an analysis of the liquors, the liquid is siphoned or otherwise transferred to precipitation tank 12, passing through the filter 13 on its way to the precipitating tank, the filter 13 removing entrained solids from the solution before it reaches the precipitation tank.

The solution in the precipitation tank is treated by an electropositive metal fed into the tank 12 from a bin 14 by means of discharge chute or conveyor 15. Thorough intermixing of the solution and precipitating metal is effected by means of a suitable agitator 16 operating in the tank 12, which agitator also effects the removal of bubbles of hydrogen which tend to collect on the surface of the precipitant metal, thus enabling the latter to continue to pass freely into solution. Aluminum is a suitable precipitant where copper is the metal being recovered, although, of course, other metals electropositive to copper may be employed. Agitator 16 may be conveniently of the same type as agitator 9. The depth of liquid in the precipitation tank 12 is readily determinable by the provision of a gauge 17. The precipitation tank 12 is in communication also with the deoxidized water reservoir 3 and is adapted to receive deoxidized water therefrom as may be required to adjust the volume of liquid in the precipitation tank.

Flow of solution from the leaching tank 4 to the precipitation tank 12 is controlled by an indicating valve 18, which renders visible the flow of liquid passing from the leaching tank to the precipitation tank. A similar valve 19 controls the flow of spent liquid from the precipitation tank. This liquid may be sent into a variety of directions. If the acidity of the spent solution is sufficient, the solution may be returned to the leaching tank, being filtered on its way by passing through the filter 20, circulation of the material being effected by a pump 21.

When the spent solution has become too exhausted to be returned to the leaching tank, it is sent on to the finished liquor tank where it may be stored until treated for the recovery of the salts dissolved therein.

The copper from the precipitation tank 12 is sent to the washer 23, where it is washed by deoxidized water from the reservoir 3. The wash liquors may be pumped by pump 21 from the washer 23 to the leaching tank 4 through filter 20, the washed precipitated metal being passed on to the dryer 24 from the washer 23, being finally discharged from the dryer through outlet 25.

The units are arranged in cascade so that the liquids may flow through the system by gravity, the pump 21 being used only to return the liquids as described above to the leaching tank. Obviously suitable control valves may be disposed through the system as required and the various units and connecting pipes are formed of acid resisting materials so that excessive corrosion and contamination of the liquids will be avoided.

It is thought that the operation of the process will be obvious from the above description. Water is introduced from the source into filter 1 where it is freed from mechanically suspended particles. It then passes through a deoxidizer 2 where the dissolved oxygen is removed. Any suitable means may be provided for the removal of the oxygen, such as metallic iron, or other means may be employed such as the application of electricity to the water to create a static field therein, thus causing the dissolved oxygen to coalesce into bubbles and thus be removed from the water. When iron is employed, a chemical reaction occurs with the oxygen in accordance with the equation:

$$4Fe + 3O_2 = 2Fe_2O_3$$

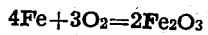

The water as it becomes deoxidized passes into the reservoir 3 from which it may flow by gravity through the system.

The ore bin 5 is supplied with the metal bearing material to be leached, such as copper or oxide ores, or copper sulphate. This material is preferably ground sufficiently finely to pass through a one hundred mesh screen. In order to utilize sulphide ores, they are given an oxidizing roast to convert them to oxides. A suitable solvent, such as sulphuric or hydrochloric acid, is placed in the solvent reservoir 7, the quantity of which is determinable by the gauge 8. The ore or sulphate is fed from the ore bin 5 into the leaching tank 4 in such quantity as may be desired by the operator, the solid material to be leached being introduced through the chute 6. Water from the deoxidized water reservoir 3 is allowed to flow into the leaching tank, in practice, sufficient water being introduced usually to cover the solid material to a depth of three or four feet which can be determined by means of the gauge 10. The proportion of acid to water may be varied as required by operating conditions, a suitable concentration frequently found being about four parts by volume of acid to one part by volume of water. The agitator 9 is operated to agitate the solid and solvent materials and to mix them thoroughly but slowly, the contact between the solvent and the material being maintained until a thorough leaching action is accomplished. Samples of the resulting solution may be taken from time to time for analysis to determine the progress of the leaching operation. Approximately four hours may be required as determined by the quantities and concentration of the materials.

When the leaching action is determined to have proceeded sufficiently, the agitator 9 is stopped and the undissolved residue is allowed to settle.

The more or less clear supernatant liquid is siphoned or pumped by a pump 26 into the precipitation tank 12 through filter 13, which removes suspended solids. Assuming that copper carbonate was the material leached and hydrochloric acid was the solvent employed, the solution entering the precipitation tank would be essentially cupric chloride, formed in accordance with the reaction, $$CuCO_3 + 2HCl = CuCl_2 + H_2O + CO_2$$

If sulphuric acid were employed as the leach acid, the solution entering the precipitation tank would be essentially copper sulphate, $CuSO_4$, as will be obvious. Of course, the solution will be acid in reaction, the quantity of free acid present depending upon the completeness of the leach. Deoxidized water from the reservoir 3 is introduced into the precipitation tank 12, volume for volume of the solution. The indicating valve 18 permits the color of the leach solution to be observed and upon it becoming dark or clouded with suspended particles, the pump 26 should be stopped to prevent clogging of the filter 13.

At suitable intervals, precipitant metal is fed into the precipitating tank 12 from the bin 14. When copper is the metal being precipitated, the precipitant metal may be aluminum or zinc, although other metals electropositive to copper may be used as the precipitant metal. The precipitation of the copper takes place in accordance with the reaction:

$$3CuCl_2 + 2Al = 2AlCl_3 + 3Cu$$

The volume of the solution in the tank 12 may be observed by means of the gauge 17, and the materials in the tank may be agitated by agitator 16 as the precipitation proceeds. Suitable samples of the liquid may be taken as desired and quantitatively analyzed for copper.

The precipitant metal, such as aluminum, is weighed before being introduced into the precipitating tank 12. Its weight should be approximately one-half of one per cent. less than that of the copper in solution in the precipitation tank.

During the precipitation of the copper, there will be an evolution of hydrogen gas, especially where aluminum is the precipitant, this gas tending to retard chemical action by collecting on the surfaces of the aluminum. Agitator 16, being kept in motion, however, liberates these gas bubbles and at the same time removes by friction any precipitated copper adhering to the precipitant metal, resulting in a more efficient operation by maintaining fresh surfaces of the precipitant metal in contact with the solution.

This agitated precipitating action is continued until gas bubbles cease to be liberated, indicating a thorough and complete replacement of all of the copper with aluminum. The agitator 16 is then stopped and the liquid is allowed to stand quietly until solids have settled. Settling is allowed to continue until a fairly clear liquid shows in gauge 17. It is to be borne in mind that the precipitation of the copper is carried out in the absence of any substantial amounts of dissolved oxygen in the solutions.

When the precipitated copper has settled, the bulk of the supernatant liquid is withdrawn from the precipitation tank into the finished liquor tank 22 for subsequent treatment, the indicator valve 19 rendering visible the condition of this liquid.

The precipitated copper is withdrawn from the precipitation tank 12 through a suitable gate in the bottom of the tank and is passed into the precipitate washer 23 where it is washed with deoxidized water from the deoxidized water reservoir 3. After thorough washing, the precipitate is withdrawn from the washer 23 and enters the dryer 24 where it is thoroughly dried with heat not exceeding 160° F. in temperature.

From the dryer 24, the product which is finely divided metallic powder as low as 0.01 millimeter particle size is passed out through the chute 25 into suitable containers.

The precipitation of the copper having been carried out in the absence of free oxygen, the product is pure metallic copper, substantially entirely free from contaminating oxides.

After one complete operation or cycle, a sludge or residue will be found in the bottom of the leaching tank. If an analysis of the same shows a thorough leaching of its copper content, this sludge is withdrawn from the bottom of the leaching tank and emptied into the sludge tank 11 for further treatment for recovery of other values contained therein.

The precipitating liquid left in the precipitating tank 12 will contain 0.5% copper, as above indicated and at the same time it will show an acid content strong enough to be used in a second leaching operation. It may be pumped, therefore, from the tank 12 through filter 20 by means of pump 21 and thus returned to the leaching tank 4.

Also, after washing the precipitate in the washer 23, the wash liquors will contain some dissolved copper and acid. These liquors may be returned also through filter 20 and pump 21 to the leaching tank to be used again.

When the liquid resulting from the precipitation of the copper becomes saturated with aluminum, it is withdrawn into the finished liquor tank 22 for subsequent recovery of aluminum chloride or sulphate or other valuable by-products.

The copper, it has been said, is precipitated in the absence of any substantial amounts of dissolved free oxygen, so that the precipitated copper is free from oxide, the product being a bright, highly polished metallic powder. The entire operation is conducted so that there will be no air in contact with the copper and the product is preserved out of contact with the air. The product is extremely finely divided, the particle size being such that the separate particles can be seen only through a high magnification thereof.

An important use of the product is in the production of paint pigment. This finely divided unoxidized copper has a very high affinity for oxygen, and will combine with any unabsorbed oxygen present in the paint carrier or vehicle, thus resulting in a chemically combined pigment and vehicle. For example, it is apparent, of course, that in the case of white lead and linseed oil, the combination is a mechanical mixture only, but the addition of powdered copper of the present invention with its high reactivity for oxygen and carbon dioxide, produces a green pigment by virtue of the combination of the unoxidized copper powder with the dissolved oxygen and because of the extremely small particle size, the particles of the copper being substantially microscopic in nature, the particles of copper will actually penetrate into the pores or fibers of the material being painted, so that upon drying of the paint there will be an actual intercellular or inter-pore deposit of copper compound which cannot peel off or rub off, and thereby leave an unprotected surface. In other words, the paint using the unoxidized copper of the present invention actually dyes the material being painted and gives to it a dull sheen. This is of importance because of the toxic properties of copper salts, the interpore or intercellular deposits of which in accordance with the present invention effectively prevent inroads of bacteria, termites and other destructive agencies.

It is to be understood, of course, that the invention is not to be limited to the precise steps described herein, as these are to be regarded as illustrative only of a suitable procedure for operating the invention, and that other modes of operation may suggest themselves readily to one skilled in the art while clearly coming within the scope of this invention; and also it will be apparent that the process is applicable to the production of many metal powders of very small particle size, the selection of the product being in accordance with the position of the metal in the electromotive series and considerations of cost of the precipitant. It will be apparent, therefore, that many modifications of the herein described procedure may be made without departing from the inventive concept which modifications will readily become suggested to one skilled in the art; and that, accordingly, it will be understood that it is intended and desired to embrace within the scope of this invention such modifications and changes as may be necessary to adapt it to varying conditions and uses.

I claim:

1. A method of producing substantially pure metal which comprises preparing a deoxidized solution of metal-bearing material, precipitating by cementation the metal therefrom substantially free from oxide while maintaining the solution in deoxidized condition and reusing the deoxidized metal-depleted solution for dissolving further quantities of metal-bearing material by recycling the metal-depleted solution in contact with the said metal-bearing material while preventing absorption of air by the said solution.

2. A method of producing substantially pure metal which comprises preparing a deoxidized solution of metal-bearing material, precipitating by cementation the metal therefrom in powdered form while maintaining the solution in deoxidized condition, removing the precipitated metal powder from the solution, washing the said powder with deoxidized water, and drying the powder while preventing oxidation thereof.

3. A method of producing substantially pure metal which comprises preparing a deoxidized solution of metal-bearing material, precipitating by cementation the metal therefrom in powdered form while maintaining the solution in deoxidized condition, removing the precipitated metal from the solution, washing the said powder with deoxidized water, drying the powder while preventing oxidation thereof, and reusing the deoxidized metal-depleted solution for dissolving further quantities of metal-bearing material by recycling the metal-depleted solution in contact with the said metal-bearing material while preventing absorption of air by the said solution.

4. A method of producing substantially pure metal which comprises preparing a quantity of deoxidized water, dissolving a supply of metal-bearing material in a suitable solvent in the presence of a quantity of the deoxidized water, filtering the resulting substantially deoxidized solution, precipitating by cementation the metal from the said solution while maintaining the same in deoxidized condition, and adding further quantities of the deoxidized water thereto as required.

5. A method of producing substantially pure copper which comprises deoxidizing a quantity of water, leaching a quantity of copper ore in the presence of some of the deoxidized water, and precipitating metallic copper from the resulting solution by adding thereto a metal electropositive to copper while maintaining the solution in a substantially deoxidized condition.

6. A method of producing substantially pure copper which comprises deoxidizing a quantity of water, leaching a supply of copper-bearing material with a suitable solvent therefor in the presence of a quantity of the deoxidized water, and precipitating metallic copper from the resulting solution by adding thereto a metal electropositive to copper and further quantities of the deoxidized water as required, while maintaining the solution in a substantially completely deoxidized condition and conducting the precipitation under conditions favoring the precipitation of copper in powdered form.

7. A method of producing substantially pure copper which comprises deoxidizing a quantity of water, leaching a supply of copper-bearing material with a suitable solvent in the presence of a quantity of the deoxidized water, precipitating metallic copper from the resulting solution while maintaining the solution in a substantially completely deoxidized condition, adding further quantities of deoxidized water as required to maintain a required volume of solution, and contacting the deoxidized copper-depleted solution with fresh quantities of copper-bearing materials for replenishing the copper content of the solution by dissolving further quantities of the copper-bearing materials.

8. A method of producing substantially pure copper which comprises deoxidizing a quantity of water, leaching a supply of copper-bearing material with a suitable solvent in the presence of a quantity of the deoxidized water, precipitating metallic copper from the resulting solution by adding an electropositive metal, such as aluminum or zinc, thereto in quantities slightly less than sufficient to precipitate the copper completely while maintaining the solution in a substantially completely deoxidized condition, maintaining the required volume of the solution by adding thereto further quantities of deoxidized water, and leaching further quantities of copper-bearing material with the deoxidized copper-depleted solution.

9. A method of producing substantially pure copper which comprises deoxidizing a quantity of water, leaching a supply of copper-bearing material with a suitable solvent in the presence of a quantity of the deoxidized water, precipitating metallic copper from the resulting solution by adding an electropositive metal, such as aluminum or zinc, thereto while maintaining the solution in a substantially deoxidized condition, and effecting the precipitation of the copper in powder form.

10. A method of producing substantially pure copper which comprises deoxidizing a quantity of water, leaching a supply of copper-bearing material with a suitable solvent in the presence of a quantity of the deoxidized water, precipitating metallic copper from the resulting solution by adding thereto a metal selected from the group consisting of zinc and aluminum in quantities slightly less than sufficient to precipitate the copper completely while maintaining the solution in a substantially completely deoxidized condition, maintaining the required volume of the solution by adding thereto further quantities of deoxidized water, and leaching further quantities of copper-bearing material with the deoxidized copper-depleted solution.

11. A method of producing substantially pure copper which comprises deoxidizing a quantity of water, leaching a supply of copper-bearing material with a suitable solvent in the presence of a quantity of the deoxidized water, precipitating metallic copper from the resulting solution by adding thereto a metal selected from the group consisting of aluminum and zinc while maintaining the solution in a substantially deoxidized condition, and effecting the precipitation of the oxygen-free copper in powder form.

JOHN AUGUSTUS MURPHY, Jr.